June 20, 1961

P. F. GOOD 2,989,104

FOOD SLICE GROUPING MACHINE

Filed March 29, 1955

INVENTOR
PAUL F. GOOD,

BY *Bailey, Stephens and Huettig*

ATTORNEYS

June 20, 1961 P. F. GOOD 2,989,104
FOOD SLICE GROUPING MACHINE
Filed March 29, 1955 11 Sheets-Sheet 9

INVENTOR
PAUL F. GOOD,
BY
ATTORNEYS

June 20, 1961  P. F. GOOD  2,989,104
FOOD SLICE GROUPING MACHINE
Filed March 29, 1955  11 Sheets-Sheet 10

INVENTOR
PAUL F. GOOD,
BY Bailey, Stephens and Huettig
ATTORNEYS

United States Patent Office 2,989,104
Patented June 20, 1961

2,989,104
FOOD SLICE GROUPING MACHINE
Paul F. Good, Baltimore, Md., assignor to Albert F. Goetze, Incorporated, Baltimore, Md., a corporation of Maryland
Filed Mar. 29, 1955, Ser. No. 497,554
7 Claims. (Cl. 146—94)

This invention relates to a food slice grouping machine. In particular, the invention relates to the bunching of food slices, such as luncheon meats, into groups ready for packaging.

Foods, such as luncheon meats, are ordinarily sliced in a slicer having a reciprocating knife, and discharged onto a conveyor belt, the slices then being manually gathered into groups and then manually weighed and packaged. These groups of slices usually contain eight slices and weigh six ounces. The present cost of slicing and weighing is high because of these manual operations. Even though a rotary knife slicer is used, the slices still are discharged onto a moving conveyor belt. The operators then manually take groups of eight slices from the belt and weigh them. If the weight is under six ounces, they remove one of the slices and replace it with a thicker slice. If the weight is over six and one-fourth ounces, the operator replaces one of the eight slices with a thinner slice. The groups of slices are then passed to a packaging machine. The cost of correcting the off-weight units is considerable, and a great effort is made to adjust the slicer thickness controls so that eight slices will weigh slightly over six ounces. However, foods, such as luncheon meats, are first processed into loaves which are fed to the slicer. The density of the loaves is not uniform throughout successive loaves and not uniform in each individual loaf, and, consequently, the thickness of each slice does not determine its weight. These variations in the weight of the slices have been compensated for by manual manipulations at considerable expense.

The objects of the instant invention are to produce an apparatus in which loaves of food, such as luncheon meats, are sliced continuously by a high-speed rotary knife slicer; to automatically gather the slices in groups, such as a group of eight slices; to automatically pass these groups of slices to a weighing scale; and to provide means for the adjustment of the thickness of the slices according to whether the groups of slices are running over or under the predetermined allowable weight for the group of slices.

In general, these objects are obtained by employing a conventional high-speed rotary knife slicer, and providing means for collecting a predetermined number of slices on a collector rack, and when this number of slices has been collected, mechanically removing the group of slices, and mechanically transferring the group to a conveyor, which in turn automatically deposits the group of slices on a weighing scale. Means are provided so that the rate of feed of the food loaf to the rotary knife can be adjusted faster or slower, all depending on whether the readings of the weights on the scale indicate that the groups of slices are running under or over the allowable weight for a group of slices.

The means by which the objects of the instant invention are obtained are described more fully with reference to the accompanying drawings, in which.

Figure 1:
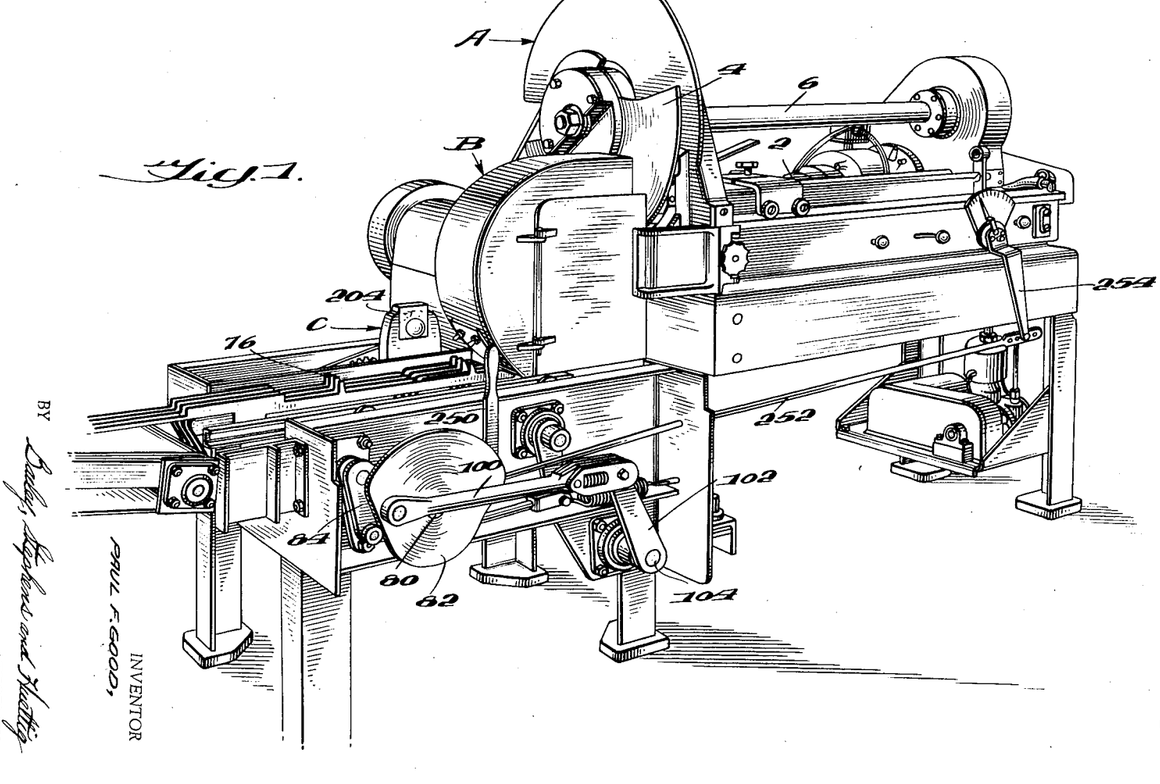
FIGURE 1 is a perspective view of the slicing, collecting and weighing apparatus.
Figure 2:
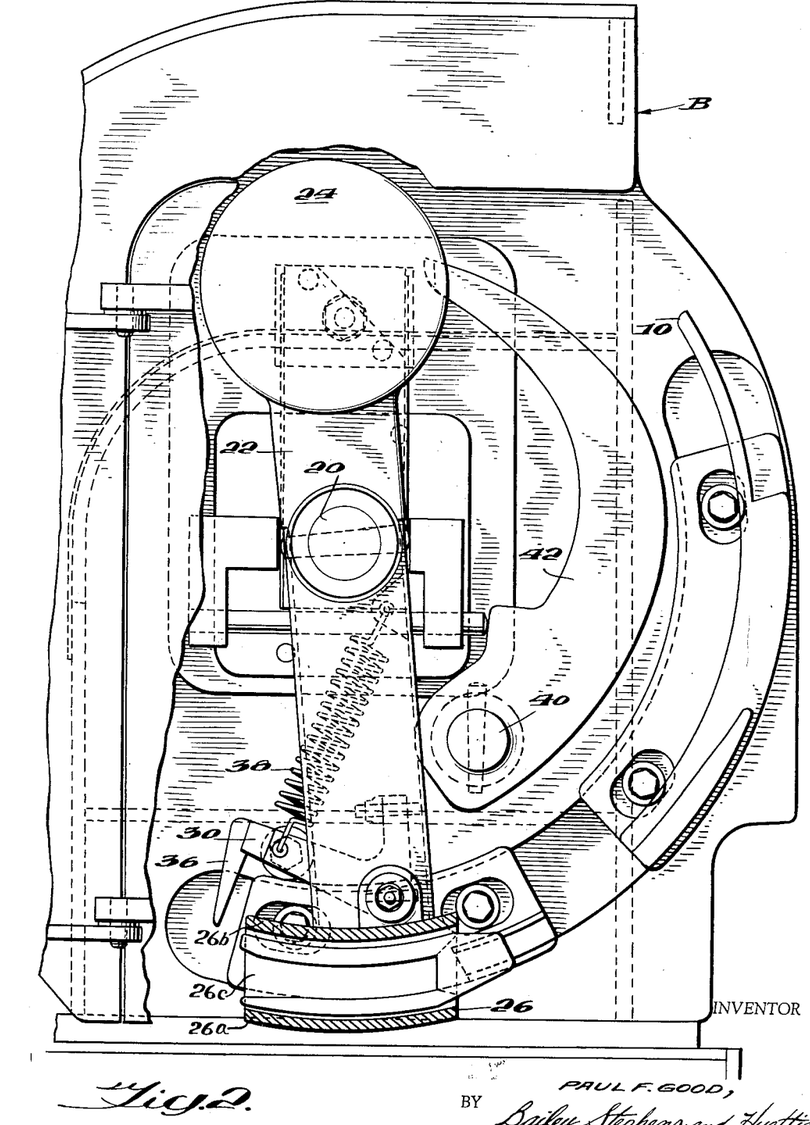
FIGURE 2 is a side elevational view of the slice collecting and transfer mechanism with a part of the lower portion shown in section.
Figure 3:
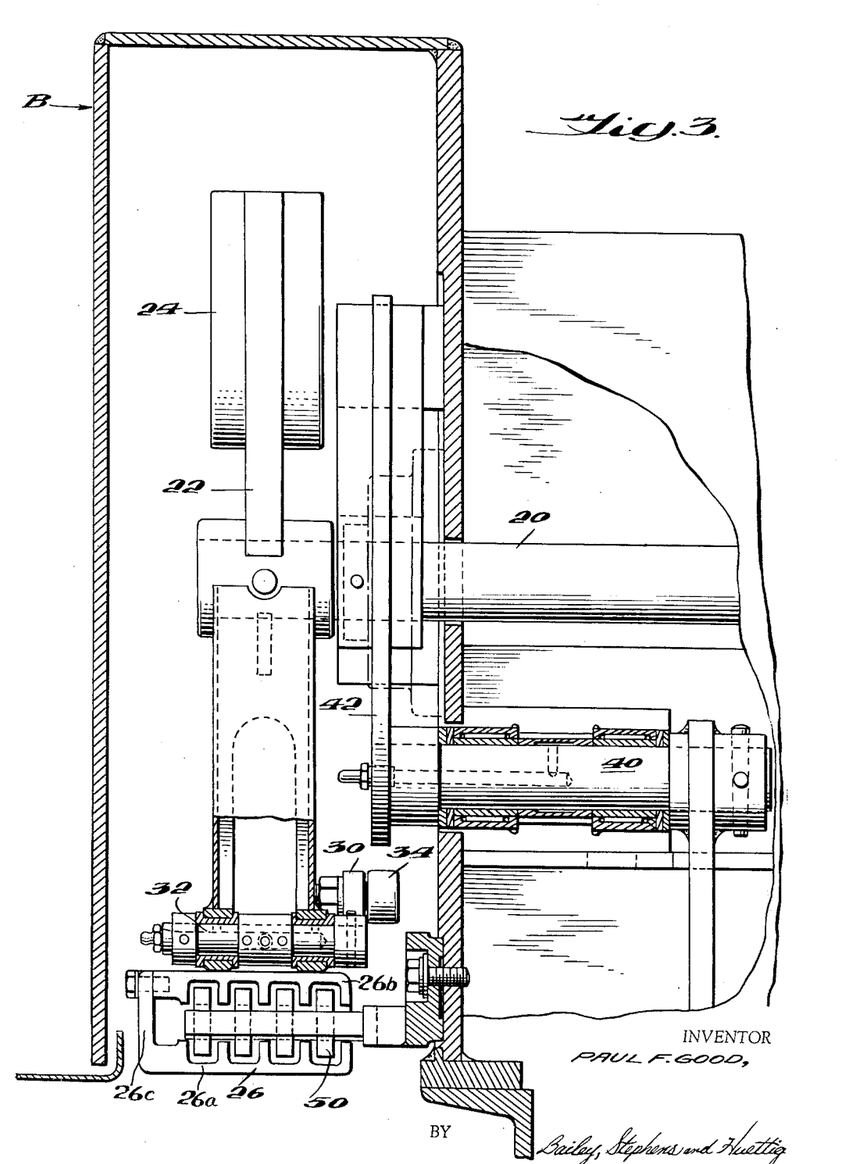
FIGURE 3 is a cross-sectional end view of FIGURE 2.

As seen in FIGURE 1 the apparatus is composed of a slicer portion A, a slice collector portion B, and a weighing portion C. The slicer mechanism in itself is old and, in general, consists of a trough 2 adapted to receive a loaf of food to be sliced, such as luncheon meat, which loaf is advanced by means of a hydraulic ram to the rotary knife 4. This knife is driven by a shaft 6 connected to any suitable power source. It is important to note that the loaf is advanced in the trough 2 continuously toward knife 4, and that a slice is cut from the end of the loaf on every revolution of knife 4. The rate of advancement of the loaf is controllable by means of values in the hydraulic ram.

Slicer portion A is made and sold by the Allbright-Nell Co., Chicago, Illinois, under the name Hydromatic Slicer and is fully described in operating instructions for the Anco No. 827 Hydromatic Bacon Slicer as revised May 14, 1952. The knife 4 is beveled, and because of the high speed of the knife, this bevel causes the cut slices of meat to be thrown in an outward and downward trajectory.

Collector portion B is shown in detail in FIGURES 2 to 5, inclusive. Secured to the housing of portion B in front of knife 4 is a rack composed of curved collector fingers 10. Slices cut from the loaf are thrown against this rack where they are retained until picked up by a carrier. These collecting fingers 10 are adjustably mounted so that they can be raised or lowered to suit the requirements of various types of foods. For example, meat packers normally slice many kinds of luncheon meats, some soft and some hard, and the trajectory of the slice cut off by knife 4 varies, both vertically and horizontally. The finger adjustment provides for the vertical variation, and means are provided for laterally shifting the entire collector portion to take care of the horizontal variation.

A shaft 20 extending horizontally through collector portion B is driven by any synchronized suitable power source, such as a power take-off from shaft 6. Mounted on shaft 20 is a lever 22 having counter weight 24 on one end, and a carrier 26 on the other end thereof. This carrier is closed on its outer end, but is open on its inner end so that it has a U-shaped cross section, and can pass by collector or rack fingers 10. The carrier 26 is a member having an outer leg or ledge 26a substantially concentric with the longitudinal axis of shaft 20 and extending parallel to said axis, and a similar inner leg 26b. These legs are joined by the bight 26c. The space between legs 26a and 26b is open on both the leading and trailing sides of carrier member 26 so that the carrier member passes rack fingers 10 with a leg on each side of the rack, that is, the rack lies between legs 26a and 26b. Carrier 26 is also curved to the same arc as are fingers 10. On the inner side of carrier 26 is an arm 30 pivotally mounted on the rotary arm 22. Arm 30 also carries a cam roller 34, note FIGURE 3. The outer end of arm 30 has pickup fingers 36 extending at right angles thereto and adapted to alternately close over the open trailing end of rotary carrier 26. These fingers are normally held in retracted position by spring 38 extending between arm 30 and arm 22. Also extending through the housing of collector portion B is a shaft 40 mounted parallel to shaft 20. The end of shaft 40 carries a curved cam arm 42 which extends over an arc of slightly less than 180° and faces collecting fingers 10. Cam arm 42 is oscillated by shaft 40 in time relation with respect to the rotation of arm 22.

Figure 4:
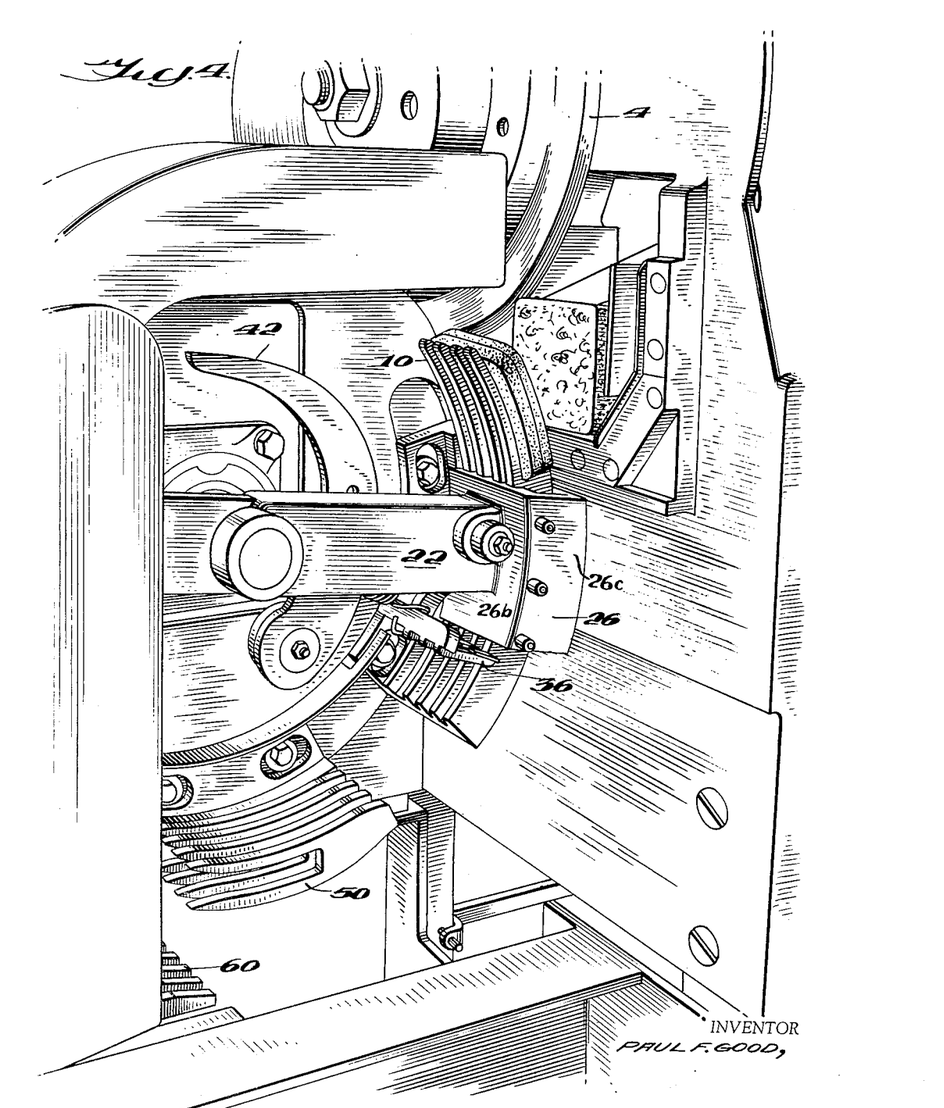
FIGURE 4 is a perspective view of the mechanism shown in FIGURE 2.
Figure 5:
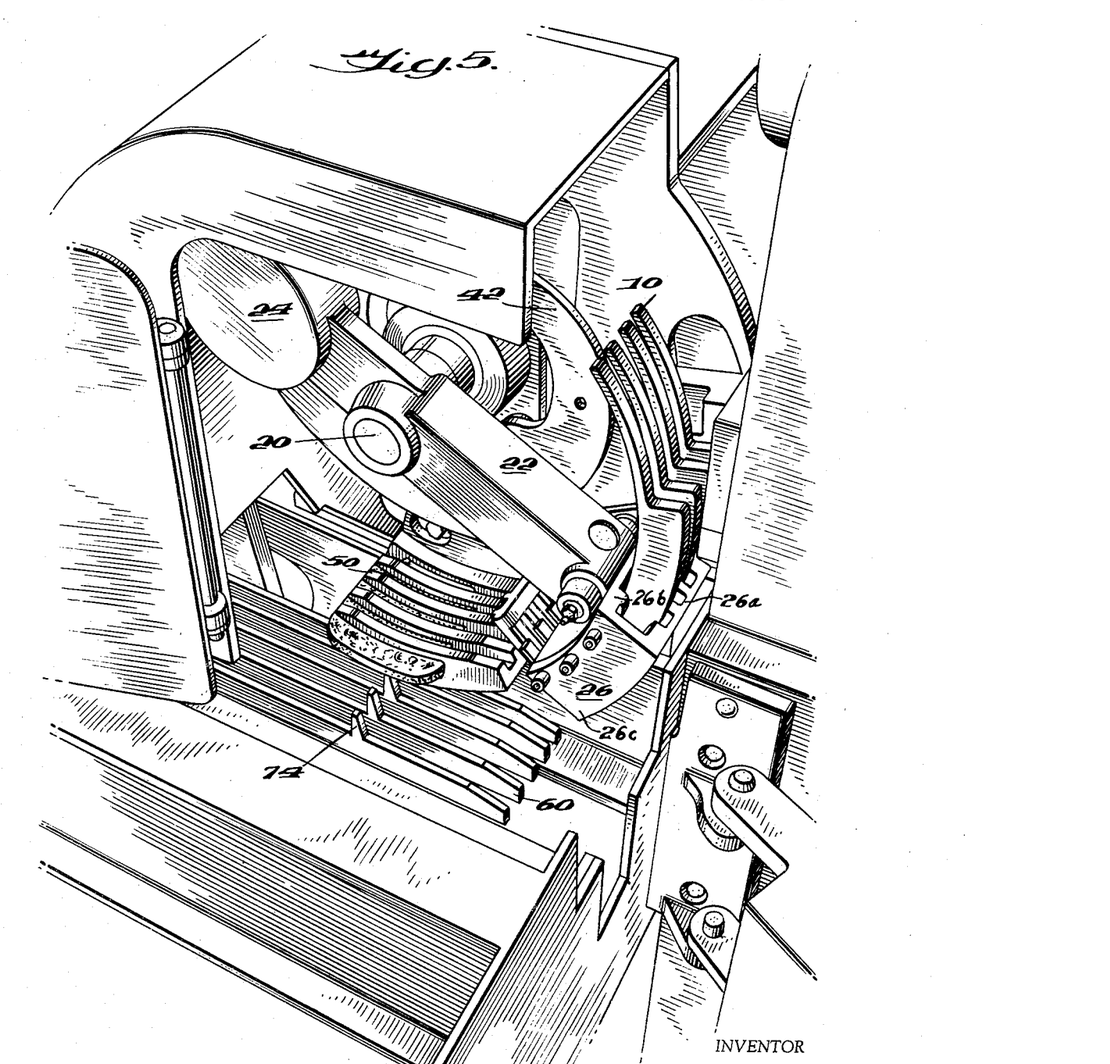
FIGURE 5 is another perspective view of the mechanism of FIGURE 2.

Secured to the bottom of the frame for collector portion B is an open box-like structure composed of a plurality of stripper fingers 50, these stripper fingers being curved on the arc of pickup carrier 26, and being U-shaped as shown in detail in FIGURE 4.

The operation of this collector portion is as follows. As knife 4 rotates, slices of meat are cut from the loaf and thrown upon the rack composed of collector fingers 10. A plurality of slices are so deposited during each revolution of arm 22. When arm 22 passes beneath the lower end of cam 42, the cam engages cam roller 34 and forces the pickup fingers outwardly so as to close off the end of the pickup carrier 26. As the pickup carrier advances upwardly, the fingers 36 pass between fingers 10 and meat slices are lifted from the collector rack. The arm continues its rotary counter-clockwise movement, and at the upper portion of its movement, the cam roller 34 leaves cam 42 and thus pickup fingers 36 are retracted. Centrifugal force keeps the slices of meat in position in pickup carrier 26. The carrier is then advanced around until the carrier moves through the stripper fingers 50, and the slices of meat are thus retained by stripper fingers 50.

In the particular apparatus illustrated in the drawings, a machine is designed so that rotary arm 22 makes two revolutions before it collects the slices of meat from the collector rack, this being accomplished by means of cam 42. For example, if it is desirable to collect eight slices in a group or bundle for packaging purposes, during one revolution of arm 22, four slices of meat will be deposited upon collector fingers 10. Cam 42 is so synchronized that it is retracted when during the first revolution the pickup carrier 26 bypasses fingers 10, and inasmuch as pickup fingers 36 are in retracted position, no slices are taken off fingers 10. During the next revolution of arm 22, a number such as four more slices are deposited on fingers 10, making a total of, for example, eight slices thereon. During this revolution cam 42 is advanced so that pickup fingers 36 are closed over the end of pickup carrier 26, and as the carrier passes fingers 10, the group or bunch of slices is removed from fingers 10 and taken around to stripper fingers 50. The rotational velocity of carrier 26 is such that it removes the slices from fingers 10 and clears these fingers before the next slice of meat is thrown onto the fingers by rotary slicer blade 4. This two-revolution pickup system is desirable because otherwise the arm 22 would have to be made twice as long, and the mechanism would then become too large to be readily adapted to the slicing machine A. Carrier 26 can rotate at approximately 240 r.p.m., and the centrifugal force at this high speed presses the slices together in carrier 26, and thus enables the group of slices better to hold its shape during subsequent operations.

This feature of the machine has the further advantages in that the loaf is advanced continuously to the rotary blade 4, and the slicing is uninterrupted. This means that the slices are uniform and of good appearance, and pieces of slices will not be obtained as in the case of interrupted slicing as in reciprocating slicer machines.

Figure 6:
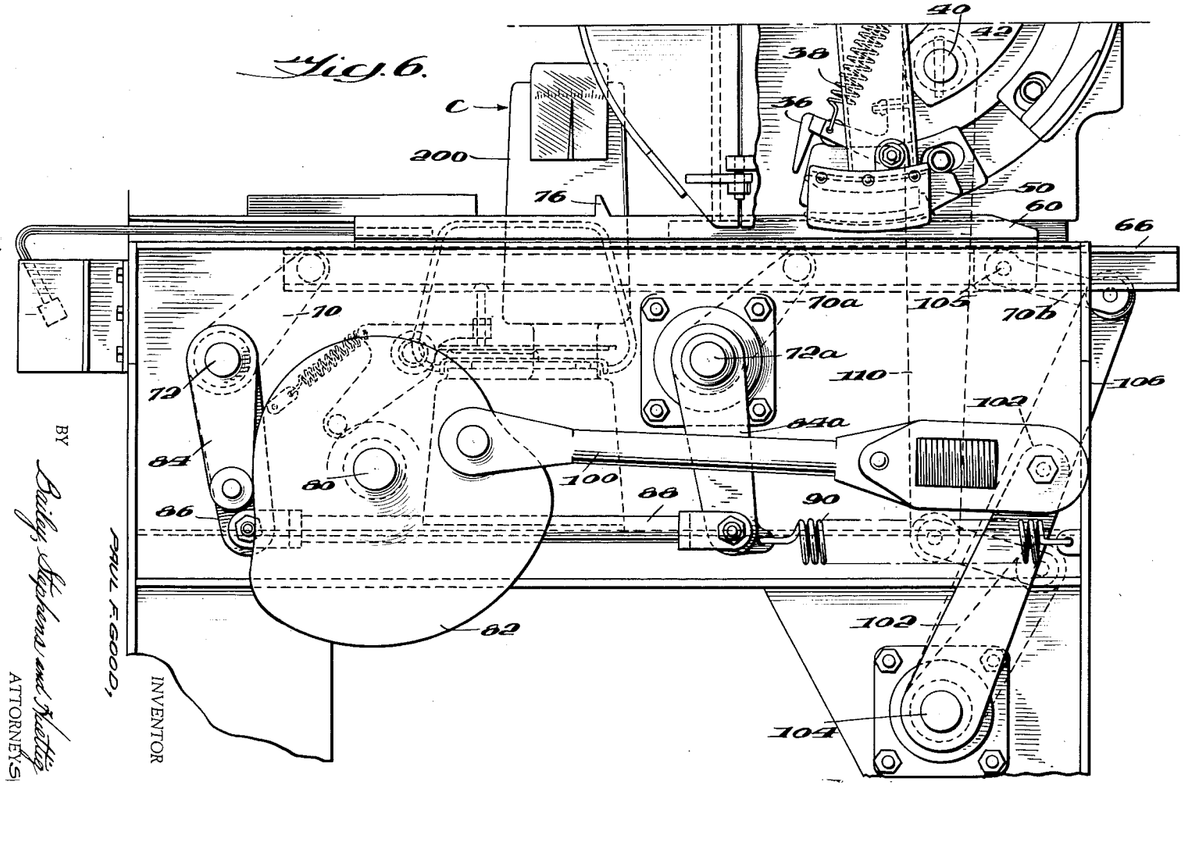
FIGURE 6 is a side elevational view of the conveyor portion of the apparatus for moving the group of slices from the collector to the weighing scale.
Figure 7:
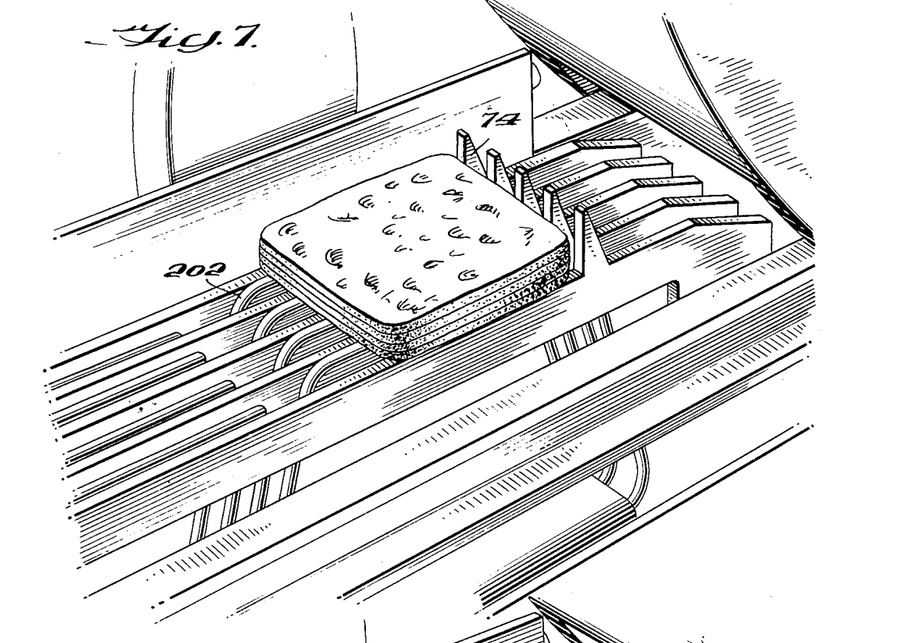
FIGURE 7 is a perspective view of a portion of the conveyor.
Figure 8:
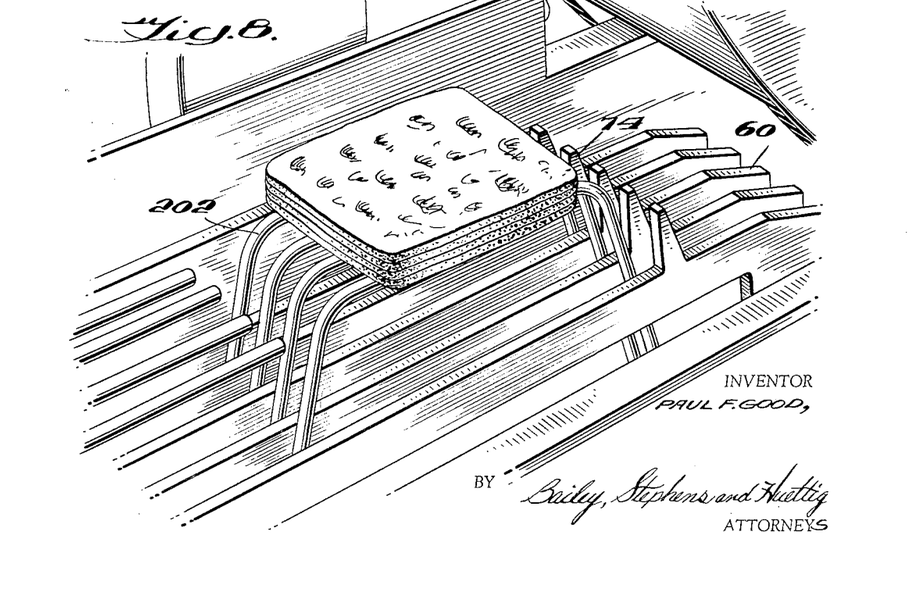
FIGURE 8 is another perspective view of the portion of the conveyor at the weighing scale.
Figure 9:
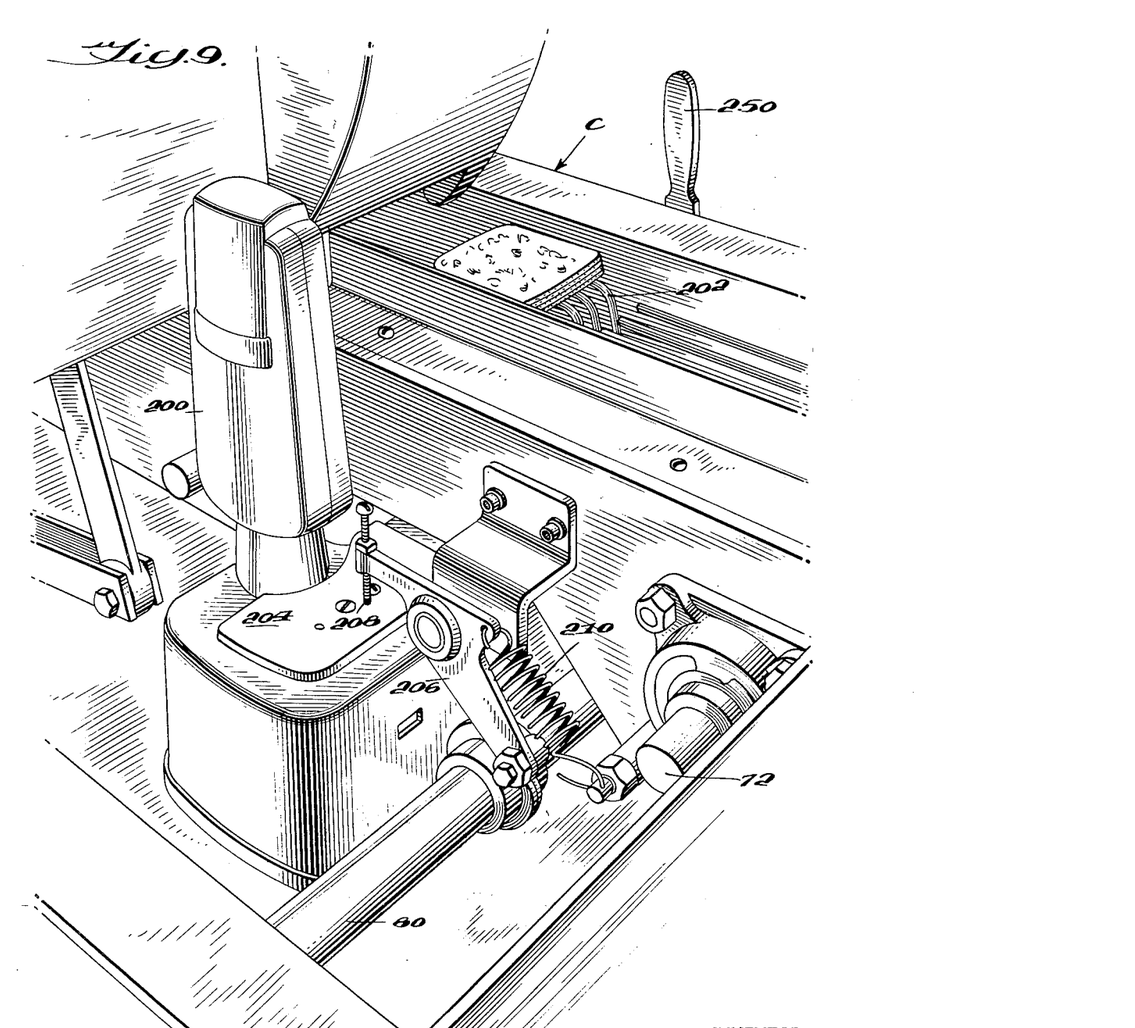
FIGURE 9 is a perspective view of the weighing portion of the apparatus.
Figure 10:
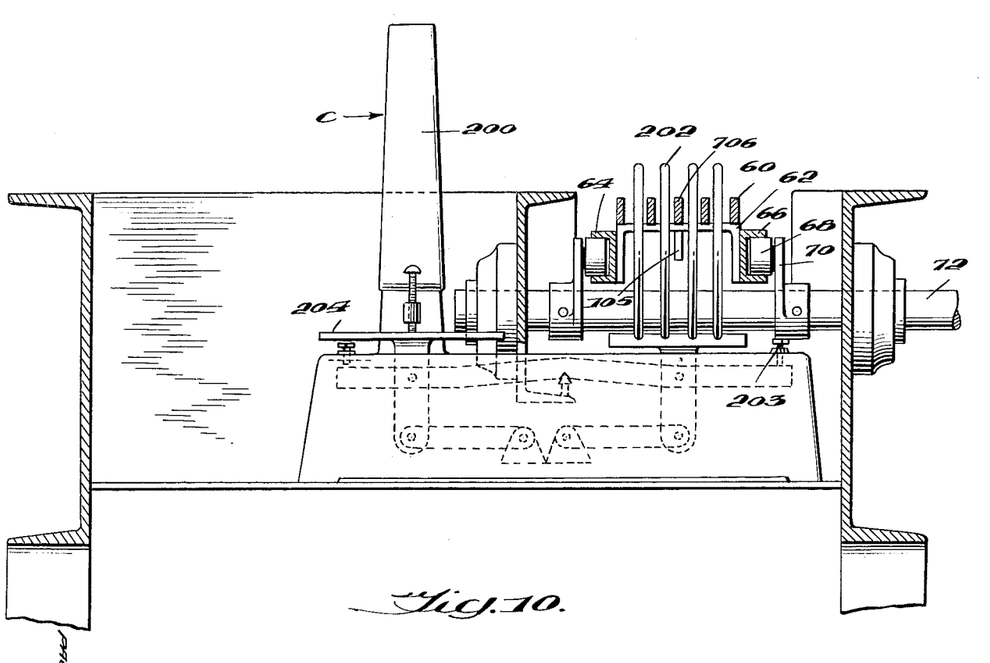
FIGURE 10 is a cross-sectional view through the weighing scale portion of the apparatus.

Mounted beneath collector portion B is a reciprocating conveyor rack for the purpose of transferring a group of slices from the stripper fingers 50 to the weighing portion C. As shown in FIGURES 7, 8 and 10, this conveyor is composed of a plurality of spaced parallel bars 60 interconnected at their ends by a U-shaped piece 62, which is joined to a pair of outwardly facing channels 64 and 66, inclusive. Rollers 68 are mounted in these channels, which rollers in turn are rotatably fixed to arms 70 fixed to a plurality of oscillatable shafts 72 and 72a. On the upper edges of bars 60 are a first set of upstanding fingers 74, which cooperate with stripper fingers 50 to move the bundle from the stripper fingers to the weighing scale platform, and a second set of fingers 76, note FIGURE 6, for transferring the bundle of slices from the scale platform to means for further transferring the bundle of slices to a packaging machine.

The conveyor rack is raised and lowered, and reciprocated forwards and backwards by any suitable mechanism in time relationship with respect to the rotation of collector arm 22. As best seen in FIGURES 1 and 6, a shaft 80 rotates a cam 82, shaft 80 being driven by a power take-off from slicing machine shaft 6. This cam oscillates arm 84, which in turn oscillates shaft 72 to which arm 70 is attached. A second arm 86 atached to shaft 72 is connected by means of rod 88 to another arm 84a, which in turn rotates shaft 72a to actuate arm 70a. A spring 90 attached to end of arm 84a and to the machine frame serves for the purpose of holding the cam follower of arm 84 against cam 82.

Rod 100 is attached at one end to cam 82 and at the the other end to arm 102 connected to shaft 104. Arm 106 attached to shaft 104 extends upwardly and is in turn connected to arm 70b extending to lug 105 attached to frame 62 for the purpose of reciprocating the conveyor. Also attached to shaft 104 is a linkage system indicated by the dotted lines 110 connecting shaft 104 with shaft 40 which actuates cam 42. Thus, movements of cam 42 are synchronized with the movements of the conveyor rack.

In operation, as cam 82 rotates, the conveyor rack is brought rearwardly and downwardly so that the fingers 74 lie beneath and slightly rearwardly of stripper fingers 50, just prior to the time that collector 26 has deposited a bundle of slices in stripper fingers 50. As the cam rotates, the conveyor rack rises to the position shown in FIGURE 6 and then moves forwardly to advance the bundle of slices to the weighing scale.

The weighing scale portion C of the apparatus is disclosed in detail in FIGURES 6 to 10, inclusive. It is composed of a conventional high-speed weighing scale 200 having a weighing platform 202 composed of a plurality of U-shaped bars connected by suitable linkage to the scale with a stop 203, and a counter platform 204. The U-shaped rods of the weighing platform 202 extend between the bars 60 of the conveyor. An arm 206 pivotally mounted on the machine frame has one arm cammed on shaft 80, and the opposite end is provided with an adjustment bolt 208, the end of which rests on counter platform 204. A spring 210 attached to arm 206 and to the machine frame serves for the purpose of holding the cam follower on the cam.

This is a high-speed weighing scale in which the weighing platform 202 is normally held in its upper unweighted position with the scale pointer set at or near 0. After the bundle of slices is deposited upon platform 202 by the conveyor, the mechanism is synchronized so that bolt 208 is lifted from the counter platform 204, thus allowing the weighing platform to move and indicate the weight of the bundle on the scale. In a normal scale the pointer usually swings past the actual weight and oscillates for a short time before coming to rest. In a high-speed weighing there is no time for allowing the pointer to settle. Therefore, in the apparatus disclosed, the pointer swings only after counter platform 204 is released, to indicate an overage or underage of the weight of the bundle of slices. Arm 206 is actuated in synchronism with the movement of the conveyor rack composed of bars 60.

In the sequence of movements, just after the weight has been indicated, the conveyor rises and fingers 76 advance to remove the bundle of slices from the weighing platform 202 toward the packaging machinery.

In the embodiment of the invention shown, an operator watches scale 200. A lever 250 is connected by rod 252 and lever 254 to the hydraulic control system of the hydraulic ram which pushes the meat loaf toward rotary slicer blade 4. All depending upon whether the weight of the bundles of slices are running over or under the allowable weight, the operator moves lever 250 so as to adjust the rate of feed of the hydraulic ram. This rate of adjustment will vary from loaf to loaf, and within individual loaves.

Figure 11:
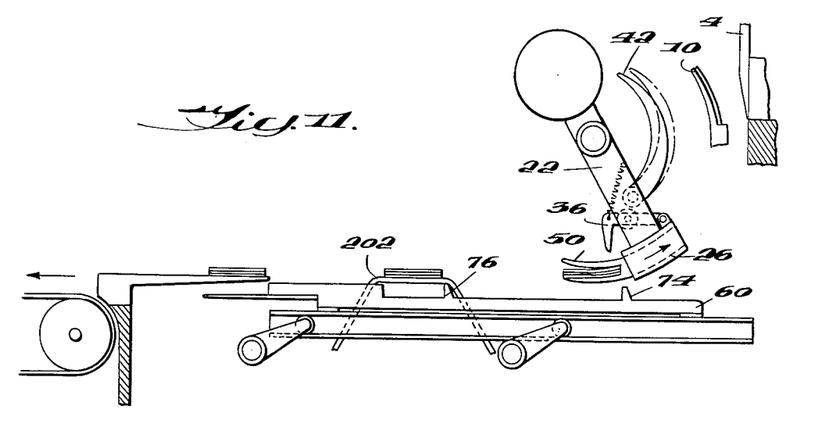
FIGURES 11 to 14 are schematic views showing the relative position of the different portions of the apparatus during the collecting, transfer, and weighing of the groups of slices.

The relative position of the various portions of the apparatus during various portions of the cycle of operation of the apparatus is illustrated in FIGURES 11 to 14, inclusive. In FIGURE 11 the carrier 26 has just deposited a bundle of slices in the stripper fingers 50. The conveyor bars 60 are in a rearward lowered position, and a preceding bundle of slices has been deposited upon weighing platform 202. Rotary knife 4 has deposited one or more slices of meat upon collector fingers 10. Cam 42 is in retracted position so that pickup fingers 36 are likewise retracted.

Figure 12:
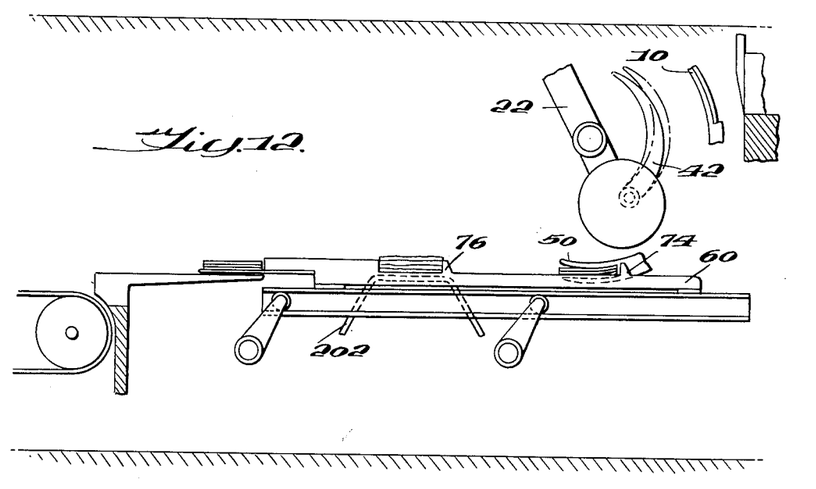

In FIGURE 12 conveyor bars 60 are raised and are advancing to remove the bundle of slices from stripper fingers 50, and carrier 26 (not shown) has swung past collector fingers 10 without removing any slices of meat therefrom. At the same time fingers 76 are in position to remove the bundle of slices from weighing platform 202.

Figure 13:
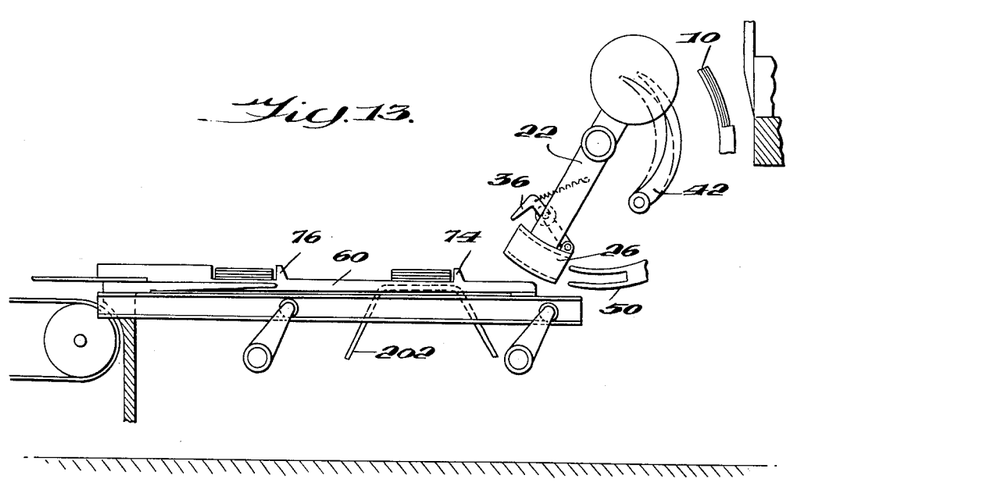

In FIGURE 13 the arm 22 is substantially half-way through its second revolution, and passes stripper fingers 50 while empty, and the pickup fingers 36 are in retracted position. Conveyor rack bars 60 have advanced the bundle of slices from their position in FIGURE 12 and have placed them upon weighing platform 202. Cam 42 has been advanced.

Figure 14:
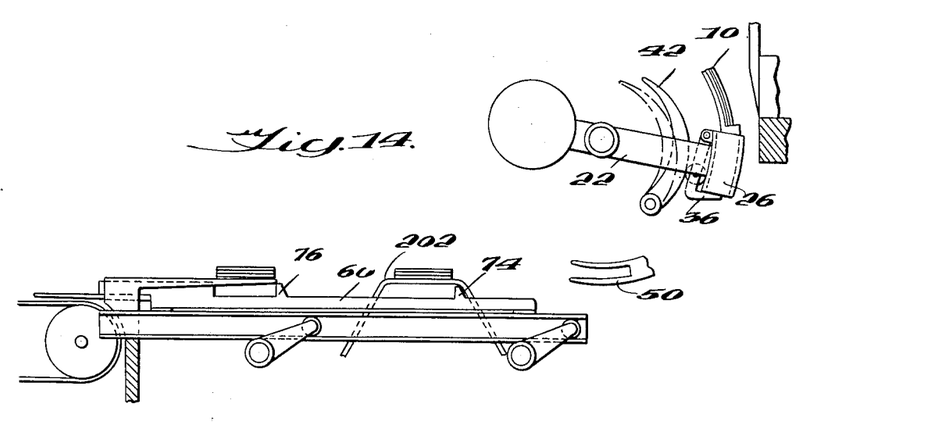

In FIGURE 14 the carrier 26 is completing its second revolution of the cycle, and cam 42 has advanced to close fingers 36 so that the slices on collector fingers 10 will be removed by the carrier. At the same time the conveyor bars 60 have been lowered so that the bundle of slices rests on weighing platform 202 and can be weighed as previously described. Fingers 76 have deposited the previously weighed bundle of slices upon a conveyor for transferring to the packaging apparatus.

The continuous slicing and slice group collecting and weighing results in a production rate higher than hitherfore obtainable. In addition the food slices are neater and more uniform than those of prior art practices, and less waste exists.

Having now described the means by which the objects of the invention are obtained, I claim:

1. A food slice transfer device for a food slice machine having a cutting knife comprising a collecting rack for receiving food slices as cut by the cutting knife, a carrier, a stripper, said carrier being mounted for movement in an angular path between and across said rack and said stripper for picking food slices from said rack and depositing them in said stripper, leg means on said carrier forming a wall against which food slices are held and compacted by centrifugal force while being moved in the angular path of said carrier, and pick-up finger means on said carrier for transferring food slices from said rack to said carrier.

2. A slice collecting mechanism for a food slicing machine having a movable knife for cutting slices of food and means for transferring the cut slices of food; comprising a rack adjacent said knife for receiving a plurality of cut slices from said knife, a shaft rotatable around its longitudinal axis, an arm joined to and extending outwardly of said shaft, a carrier member attached to said arm and having a slice supporting ledge substantially concentric with said axis, pick-up finger means mounted on said arm substantially normal to said axis and positioned closely adjacent to said ledge for removing a bundle of slices from said rack, means for rotating said shaft to move said carrier member across said rack to pick up a plurality of food slices therefrom and holding and compacting said slices into a bundle against said ledge by centrifugal force, and stripper means for removing a bundle of slices from said carrier member.

3. A slice collecting mechanism as in claim 2, further comprising reciprocating conveyor rack means adjacent said stripper means, and driving means synchronized with said shaft rotating means for moving said rack means to remove a bundle of slices from said stripper means.

4. A slice collecting mechanism as in claim 3, further comprising a weighing scale for receiving a bundle of slices from said rack means, and bolt means actuated by said driving means for immobilizing said scale during the placing of a bundle of slices upon said scale.

5. A slice collecting mechanism as in claim 4, said stripper means comprising spaced stripper fingers for holding a bundle of slices removed from said carrier, said reciprocating rack means comprising spaced parallel bars having upstanding fingers positioned thereon for entering between said stripper fingers to engage said bundle of slices and move the bundle to said weighing scale.

6. A slice collecting mechanism as in claim 2, said pick-up finger means comprising pick-up fingers pivotally secured to said arm, and cam means for closing said pick-up fingers over the trailing side of said carrier member as said carrier member crosses said rack and releasing said pick-up fingers to uncover said side before said carrier member passes said stripper.

7. A slice collecting mechanism as in claim 6, said carrier member comprising a U-shaped body with an inner leg and said ledge as the outer leg, each leg being parallel to the longitudinal axis of said rotatable shaft, and said pick-up fingers being closable over an open side of said carrier member between the inner and outer legs.

References Cited in the file of this patent

UNITED STATES PATENTS

| | | |
|---|---|---|
| 1,192,014 | Stiles | July 25, 1916 |
| 1,385,874 | Kohr | July 26, 1921 |
| 1,519,354 | Brown | Dec. 16, 1924 |
| 1,964,152 | Hansen | June 26, 1934 |
| 1,975,917 | Bech | Oct. 9, 1934 |
| 1,993,586 | Bech | Mar. 5, 1935 |
| 2,006,091 | Walter | June 25, 1935 |
| 2,009,259 | Hall et al. | July 23, 1935 |
| 2,124,678 | Talbot | July 26, 1938 |
| 2,538,346 | Wood | Jan. 16, 1951 |
| 2,691,997 | Matarrese | Oct. 19, 1954 |
| 2,812,792 | Allbright | Nov. 12, 1957 |
| 2,834,388 | Meyer | May 13, 1958 |

FOREIGN PATENTS

| | | |
|---|---|---|
| 269,913 | Great Britain | July 21, 1927 |
| 400,383 | Great Britain | Oct. 26, 1933 |
| 601,392 | Great Britain | May 5, 1948 |
| 696,795 | Great Britain | Sept. 9, 1953 |